United States Patent
Sakurai

(10) Patent No.: US 6,335,870 B1
(45) Date of Patent: *Jan. 1, 2002

(54) INVERTER APPARATUS HAVING A SEPARATE CONTROLLING APPLICATION PROGRAM FOR PERFORMING SPECIFICATION DEPENDENT CONTROL

(75) Inventor: Hisao Sakurai, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/508,414
(22) PCT Filed: Jul. 16, 1998
(86) PCT No.: PCT/JP98/03210
  § 371 Date: Mar. 6, 2000
  § 102(e) Date: Mar. 6, 2000
(87) PCT Pub. No.: WO00/04629
  PCT Pub. Date: Jan. 27, 2000
(51) Int. Cl.$^7$ .................................. H02J 3/00
(52) U.S. Cl. ............................ 363/34; 363/95
(58) Field of Search .............. 363/37, 34, 74, 363/78, 95, 97, 98, 123, 131, 132; 318/801, 802, 803

(56) References Cited

U.S. PATENT DOCUMENTS 5,272,430 A * 12/1993 Bourgeois et al. .......... 318/812
5,866,866 A * 2/1999 Shimada ..................... 219/110
5,949,663 A * 9/1999 Endo et al. .................. 363/37

FOREIGN PATENT DOCUMENTS

JP    62-285666    12/1987    ............ H02M/5/27

OTHER PUBLICATIONS

"Microprocessor Control of an Induction Motor with Flux Regulation", P. Sen et al, IEEE Trans. Ind. Electron. Contr. Instrum., vol. IECI–28, pp. 299–303 Feb. 1981.

"A Mircrocomputer–Based Thyristor Leonard System", T. Hasegawa et al., IEEE/IECE Proc. 1981, pp. 202–206. No month.

* cited by examiner

Primary Examiner—Peter S. Wong
Assistant Examiner—Gary L. Laxton
(74) Attorney, Agent, or Firm—Sughrue Mion, PLLC

(57) ABSTRACT

An inverter apparatus which is capable of easily structuring a controlling program for controlling the inverter apparatus to cope with various specifications.

The inverter apparatus is comprised of a control section including a CPU 1 serving as a computing means for controlling a converter unit 31 and an inverter unit 33, a memory 2, a memory 3 serving as a first storage unit for storing an inverter-controlling basic program, a parameter storage unit 4 for storing parameters, and an AP S/W storage unit 5 serving as a second storage unit for storing a plurality of inverter-controlling application programs, and a display device 6 for such as a parameter unit and having a display portion and an input portion. An inverter-controlling application program is transferred from outside the inverter apparatus to the AP S/W storage unit 5 through a telecommunication means.

6 Claims, 5 Drawing Sheets

| EXECUTION PRIORITY ORDER DATA | EXECUTION- PROCESSING TIME INTERVAL DATA | AP S/W | EXECUTION PROPRIETY DATA | VECTOR NUMBER DATA |
|---|---|---|---|---|
| 1 | 10ms | AP S/W-A | 0 | 1 |
| 2 | 20ms | AP S/W-B | 1 | 2 |
| 3 | 100ms | AP S/W-C | 1 | 3 |
| | | | | |
| | | | | |

| VECTOR NUMBER DATA | EXECUTION ADDRESS DATA PORTION OF AP S/W |
|---|---|
|  |  |
|  |  |
|  |  |
|  |  |
|  |  |
|  |  |
|  |  |
|  |  |

INVERTER APPARATUS HAVING A SEPARATE CONTROLLING APPLICATION PROGRAM FOR PERFORMING SPECIFICATION DEPENDENT CONTROL

TECHNICAL FIELD

The present invention relates to an inverter apparatus including a converter unit for converting a three-phase ac power supply to dc electric power, a smoothing capacitor for smoothing the dc electric power, an inverter unit for converting the smoothed dc electric power to ac electric power with variable frequency and variable voltage, and a control unit for controlling the converter unit and the inverter unit, so as to drive a motor with a variable speed.

BACKGROUND ART

FIG. 7 is a diagram illustrating the configuration of a conventional inverter apparatus.

In the drawing, reference numeral 30 denotes a three-phase ac power supply; 31, a converter unit for converting ac electric power supplied from the three-phase ac power supply 30 to dc electric power; 32, a smoothing capacitor for smoothing this dc electric power; 33, an inverter unit for converting the smoothed dc electric power to ac electric power with variable frequency and variable voltage; 34, a CPU; 35, a memory constituted by a RAM; and 36, a memory for storing inverter controlling software which is a controlling program for controlling the inverter apparatus, the memory 36 being generally constituted by a ROM. In addition, numeral 37 denotes a parameter storage unit for storing parameters which are set on the basis of the specifications of operation of the inverter apparatus.

The control unit for controlling the converter unit 31 and the inverter uniter 33 is comprised of the CPU 34, the memory 35, the memory 36, and the parameter storage unit 37.

Numeral 38 denotes a display device for such as a parameter unit and having a display portion for displaying the state of operation of the inverter apparatus or the state of parameter setting as well as an input portion for setting data and inputting commands and the like, and numeral 40 denotes a motor.

With the conventional inverter apparatus, the CPU 34 executes the program of the inverter controlling software, which has been read from the memory 36, on the basis of various parameters which have been set in the parameter storage unit 37, whereby the inverter apparatus is controlled to output ac electric power with variable frequency and variable voltage, thereby driving the motor with a variable speed.

With the above-described conventional inverter apparatus, the arrangement provided is such that the inverter apparatus operates on the basis of the controlling program stored in advance in the memory 36 as the inverter controlling software. For this reason, there has been a problem in that in a case where special operation is required which cannot be controlled by the controlling program stored in advance in the inverter apparatus, an exclusive-use controlling program must be prepared and reinstalled in the inverter apparatus as the inverter controlling software.

In addition, there have been additional problems that in a case where all the controlling programs which can be operated are installed in advance in the inverter apparatus, it becomes necessary to increase the storage capacity of the memory, and that the running time becomes long during the operation of the inverter apparatus.

The present invention has been devised to overcome the above-described problems, and its object is to obtain an inverter apparatus which is capable of easily coping with various applications.

DISCLOSURE OF THE INVENTION

An inverter apparatus in accordance with the present invention comprises: a converter unit for converting a three-phase ac power supply to dc electric power, a smoothing capacitor for smoothing the dc electric power, an inverter unit for converting the dc electric power to ac electric power with variable frequency and variable voltage, and a control unit for controlling the converter unit and the inverter unit, so as to drive a motor with a variable speed, wherein a controlling program for controlling the inverter apparatus is separated into an inverter-controlling basic program for handling common basic performance and an inverter-controlling application program for handling different control depending on specifications, the inverter-controlling basic program is stored in a first storage unit, and the inverter-controlling application program is transferred from outside the inverter apparatus to a second storage unit through a telecommunication means.

In addition, the second storage unit is capable of storing a plurality of the inverter-controlling application programs.

In addition, the inverter apparatus further comprises a parameter storage unit to allow the setting of the propriety of execution of the inverter-controlling application program.

In addition, the inverter apparatus further comprises a parameter storage unit to allow the setting of the order of priority in the execution of the inverter-controlling application program and a processing time interval of execution thereof.

In addition, the propriety of execution of the inverter-controlling application program, the order of priority in execution thereof, and the processing time interval of execution thereof can be set in the parameter storage unit from outside the inverter apparatus through a telecommunication means.

In addition, the inverter apparatus further comprises a display device for displaying a state of installation of the inverter-controlling application program, the propriety of execution thereof, the order of priority in execution thereof, and a processing time interval of execution thereof.

BEST MODE FOR CARRYING OUT THE INVENTION

First Embodiment

Figure 1:
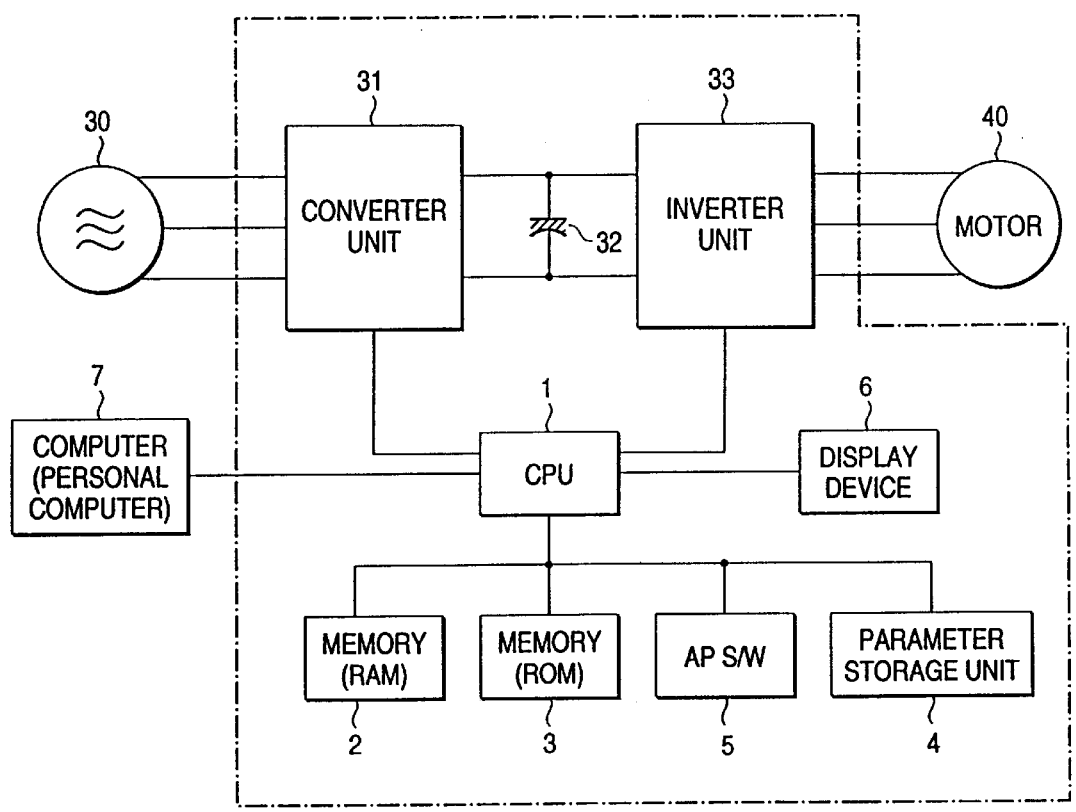
FIG. 1 is a diagram illustrating the configuration of an inverter apparatus in accordance with an embodiment of the present invention.

FIG. 1 is a diagram illustrating the configuration of an inverter apparatus in accordance with an embodiment of the present invention. In the drawing, reference numerals 30 to 33 and 40 denote the same parts as those of the above-described conventional apparatus, and a description thereof will be omitted. Reference numeral 1 denotes a CPU serving as a computing means for controlling the converter unit 31 and the inverter unit 33; 2, a memory constituted by a RAM; 3, a memory serving as a first storage unit for storing an inverter-controlling basic program; 4, a parameter storage unit for storing parameters which are set on the basis of the specifications of operation of the inverter apparatus; and 5, an application-program-software (AP S/W) storage unit serving as a second storage unit for storing a plurality of inverter-controlling application programs.

The control unit in the inverter apparatus in accordance with this embodiment is comprised of the CPU 1, the memory 2, the memory 3, the parameter storage unit 4, and the AP S/W storage unit 5.

Numeral 6 denotes a display device for such as a parameter unit and having a display portion for displaying the state of operation of the inverter apparatus or the state of parameter setting as well as an input portion for setting data and inputting commands and the like, and numeral 7 denotes a computer (personal computer) which is connected to the inverter apparatus through a telecommunication line.

In this embodiment, the controlling program for controlling the inverter apparatus is separated into an inverter-controlling basic program (hereafter referred to as the controlling basic S/W) for handling the common basic performance and an inverter-controlling application program (hereafter referred to as the controlling AP S/W) for handling different control depending on the specifications. In addition, the controlling basic S/W is installed in advance in the memory 3 of the inverter apparatus, and the controlling AP S/W required for the target operation of the inverter apparatus is transferred from the computer (personal computer) 7 outside the inverter apparatus to the AP S/W storage unit 5 through the telecommunication means and is written therein. Thus it is possible to obtain an inverter apparatus which is capable of easily structuring controlling programs for controlling the inverter apparatus in accordance with various specifications.

Figures 2, 3:
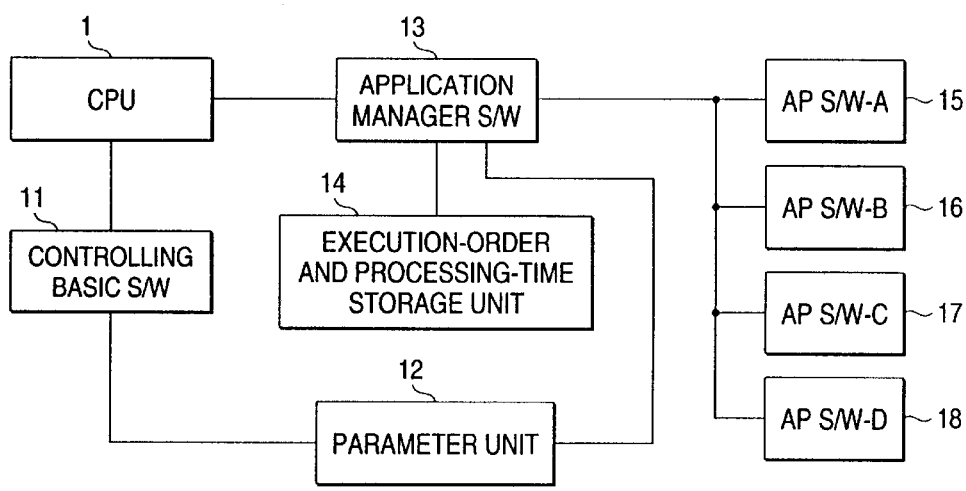
FIG. 2 is a block diagram of the inverter apparatus in accordance with the embodiment of the present invention.
FIG. 3 is a diagram illustrating the configuration of an application table in the inverter apparatus in accordance with the embodiment of the present invention.

FIG. 2 is a block diagram of the inverter apparatus in accordance with the embodiment of the present invention.

In the drawing, reference numeral 1 denotes a CPU; 11, controlling basic S/W which is installed in advance in the memory 3; 12, a unit for parameters as specifications of operation of the inverter apparatus set in the parameter storage unit 4; and 13, application manager S/W for managing the controlling AP S/W and installed in advance in the memory 3. Numeral 14 denotes an execution-order and processing-time storage unit for storing various execution data of the controlling AP S/W; and 15 to 18 denote controlling AP S/W written in the AP S/W storage unit 5. Here, numeral 15 denotes controlling AP S/W-A; 16, controlling AP S/W-B; 17, controlling AP S/W-C; and 18, controlling AP S/W-D.

Since the arrangement provided is such that the plurality of items of controlling AP S/W can be stored in the AP S/W storage unit 5 so as to manage the controlling AP S/W by the application manager S/W 13, it is possible to obtain an inverter apparatus capable of coping with a plurality of specifications.

FIG. 3 is a diagram illustrating the configuration of an application table in the inverter apparatus in accordance with the embodiment of the present invention. Here, the application table shows the setting of various execution data of the controlling AP S/W.

In the drawing, reference numeral 21 denotes execution priority order data for designating the order of priority in the execution of the controlling AP S/W; 22, execution-processing time interval data for designating a processing time interval of execution of the controlling AP S/W; 23, the appellation of the controlling AP S/W; 24, execution propriety data for designating whether the controlling AP S/W can be executed or not; and 25, vector number data for designating the vector number of the controlling AP S/W.

Here, the execution priority order data 21, the execution-processing time interval data 22, the execution propriety data 24, and the vector number data 25 which constitute the application table are read from the parameter storage unit 4, and are stored in the execution-order and processing-time storage unit 14.

Since the propriety of execution of the controlling AP S/W, the order of priority in the execution of the controlling AP S/W, and the execution-processing time interval can be set in the parameter storage unit, the use of the controlling AP S/W can be diversified.

In addition, since the propriety of execution of the controlling AP S/W, the order of priority in the execution of the controlling AP S/W, and the execution-processing time interval can be set in the parameter storage unit from outside the inverter apparatus through a telecommunication means, a change in the use of the controlling AP S/W can be made easily.

Figures 4, 5:
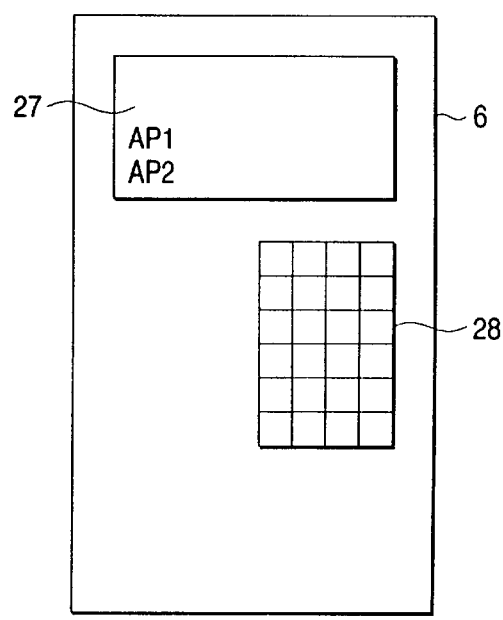
FIG. 4 is a diagram illustrating the configuration of a vector table in the inverter apparatus in accordance with the embodiment of the present invention.
FIG. 5 is a diagram illustrating an example of display in the inverter apparatus in accordance with the embodiment of the present invention.

FIG. 4 is a diagram illustrating the configuration of a vector table in the inverter apparatus in accordance with the embodiment of the present invention. Here, the vector table shows correspondence between the vector number of the controlling AP S/W and execution address data.

In the drawing, reference numeral 25 denotes vector number data for designating the vector number of the controlling AP S/W; and 26, execution address data of the controlling AP S/W.

Here, the vector number data 25 and the execution address data of the controlling AP S/W which constitute the vector table are read from the parameter storage unit 4, and are stored in the execution-order and processing-time storage unit 14.

FIG. 5 is a diagram illustrating an example of display in the inverter apparatus in accordance with the embodiment of the present invention. In the drawing, reference numeral 6 denotes the display device; 27, a display portion for displaying such as the operating state of the inverter apparatus or the state of setting of parameters; and 28, an input portion for inputting such as the setting of data or commands. Here, an example (AP1, AP2) is shown in which the controlling AP S/W being executed is displayed.

Since the display device is provided for displaying the state of installation of the controlling AP S/W, the propriety of execution, the order of priority in execution, and the execution-processing time interval, the operation of the controlling AP S/W can be confirmed easily, and it is possible to structure an optimum controlling program.

Figure 6:
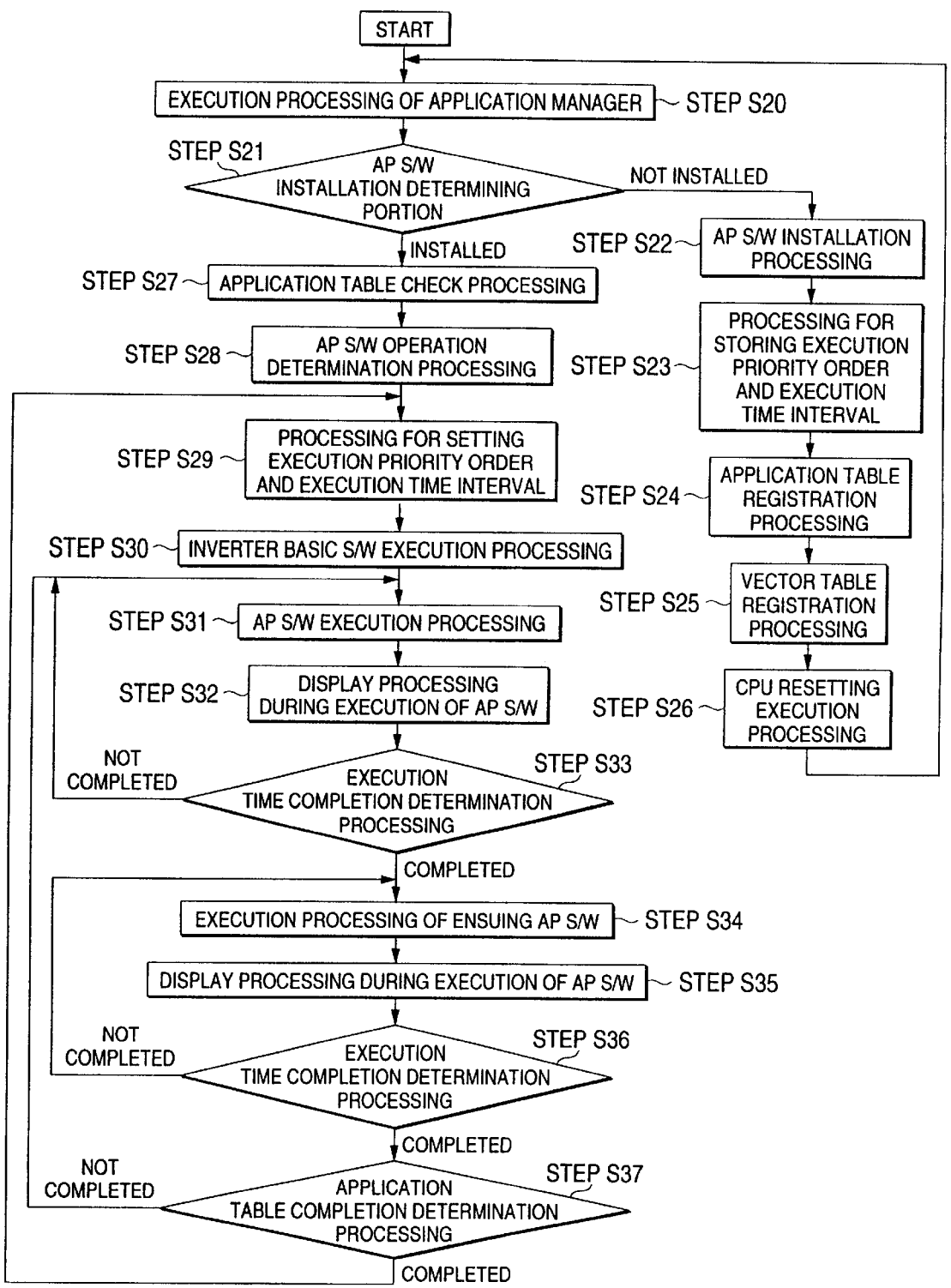
FIG. 6 is a flowchart of the inverter apparatus in accordance with the embodiment of the present invention.
Figure 7:
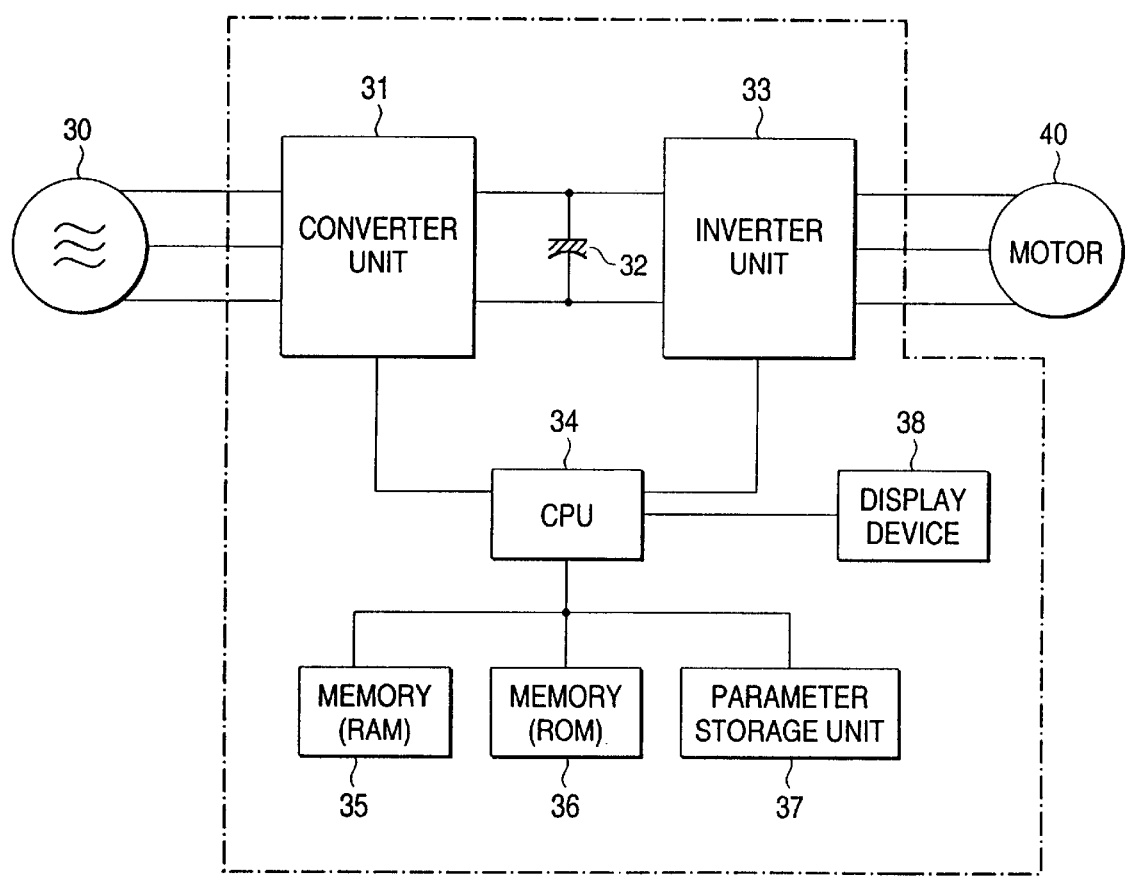
FIG. 7 is a diagram illustrating the configuration of a conventional inverter apparatus.

FIG. 6 is a flowchart of the inverter apparatus in accordance with the embodiment of the present invention.

Next, a description will be given of the operation of the inverter apparatus in accordance with the embodiment of the present invention.

When the power supply of the inverter apparatus is turned on, the controlling basic S/W 11 installed in the memory 3 is read by the CPU 1, and parameters stored in the parameter storage unit 4 are read into the memory 2.

Subsequently, in Step S20, the application manager S/W 12 is executed.

In Step S21, a determination is made as to whether or not the controlling AP S/W has been installed in the AP S/W storage unit 5.

If the controlling AP S/W has not been installed, in Step S22 the controlling AP S/W is transferred from the computer (personal computer) 7 to the AP S/W storage unit 5 by a means such as serial communication, and is written therein.

In Step S23, the execution priority order data 21 and the execution-processing time interval data 22 which have been set in the parameter storage unit 4 are read, and are stored in the execution-order and processing-time storage unit 14.

In Step S24, the execution propriety data 24 and the vector number data 25 which have been set in the parameter storage unit 4 are stored in the execution-order and processing-time storage unit 14. The application table shown in FIG. 3 is constituted by the aforementioned execution priority order data 21, execution-processing time interval data 22, execution propriety data 24, vector number data 25, and appellation 23 of the controlling AP S/W.

In Step S25, the vector number data 25 and the execution address data 26 of the controlling AP S/W which have been set in the parameter storage unit 4 are stored in the execution-order and processing-time storage unit 14. The vector table shown in FIG. 4 is constituted by the vector number data 25 and the execution address data 26 of the controlling AP S/W.

In Step S26, upon completion of the AP S/W installation processing, the CPU is reset, and the operation returns to Step S20 to execute again the application manager S/W 12.

If it is determined in Step S21 that the controlling AP S/W has been installed in the AP S/W storage unit 5, the application table is checked in Step S27, and the controlling AP S/W to be executed is retrieved in the execution-order and processing-time storage unit 14. (In retrieval, retrieval is effected starting with the controlling AP S/W having the highest execution priority.)

In Step S28, determination processing is effected at to whether or not the relevant controlling AP S/W is to be executed. In the column for the execution propriety data 24 in the application table in FIG. 3, the execution propriety is expressed as 0: cannot be executed; 1: can be executed.

In Step S29, the execution priority order data 21 and the execution-processing time interval data 22 are read from the execution-order and processing-time storage unit 14.

In Step S30, the controlling basic S/W 11 is executed.

In Step S31, the controlling AP S/W having the highest execution priority is executed.

In Step S32, the controlling AP S/W being executed is displayed as shown in FIG. 5, for example.

In Step S33, a comparison is made between the present time on the one hand, and the processing time interval data 22 in execution of the controlling AP S/W being executed and the time from the start of execution of the relevant controlling AP S/W on the other hand, for making a determination. If the running time has not elapsed, the operation returns to Step S31 to continue execution of the controlling AP S/W being executed.

If it is determined in Step S33 that the running time has elapsed, the controlling AP S/W having the next highest execution priority is executed in Step S34.

In Step S35, the controlling AP S/W being executed is displayed as shown in FIG. 5, for example.

In Step S36, a comparison is made between the present time on the one hand, and the processing time interval data 22 in execution of the controlling AP S/W being executed and the time from the start of execution of the relevant controlling AP S/W on the other hand, for making a determination. If the running time has not elapsed, the operation returns to Step S34 to continue execution of the controlling AP S/W being executed.

If it is determined in Step S36 that the running time has elapsed, in an ensuing Step S37 the registration of the controlling AP S/W is confirmed by the execution-order and processing-time storage unit 14, and a determination is made as to whether retrieval of all the items of the controlling AP S/W has been completed. If the retrieval has not been completed, the operation returns to Step S31 to execute the controlling AP S/W having a high execution priority among the items of the controlling AP S/W which are yet to be executed.

If it is determined in Step S37 that retrieval of all the registered items of the controlling AP S/W has been completed, the operation returns to Step S29, and the execution priority order data 21 and the execution-processing time interval data 22 are read again from the execution-order and processing-time storage unit 14. Then, in Step S30, the controlling basic S/W 11 is executed, and the controlling AP S/W is executed in Step S31.

INDUSTRIAL APPLICABILITY

As described above, the inverter apparatus in accordance with the present invention is capable of easily coping with various applications other than general-purpose applications, i.e., in special uses in which the number of inverter apparatuses is small or in uses for structuring exclusive-use systems such as trial manufactured machines.

What is claimed is:

1. An inverter apparatus comprising: a converter unit for converting a three-phase ac power supply to dc electric power, a smoothing capacitor for smoothing the dc electric power, an inverter unit for converting the dc electric power to ac electric power with variable frequency and variable voltage, and a control unit for controlling said converter unit and said inverter unit, so as to drive a motor with a variable speed, wherein a controlling program for controlling said inverter apparatus is separated into an inverter-controlling basic program for handling common basic performance and an inverter-controlling application program for handling different control depending on specifications, said inverter-controlling basic program is stored in a first storage unit, and said inverter-controlling application program is transferred from outside said inverter apparatus to a second storage unit through a telecommunication means.

2. The inverter apparatus according to claim 1, wherein said second storage unit is capable of storing a plurality of said inverter-controlling application programs.

3. The inverter apparatus according to claim 1, further comprising a parameter storage unit to allow the setting of the propriety of execution of said inverter-controlling application program.

4. The inverter apparatus according to claim 1, further comprising a parameter storage unit to allow the setting of the order of priority in the execution of said inverter-controlling application program and a processing time interval of execution thereof.

5. The inverter apparatus according to claim 3 or 4, wherein the propriety of execution of said inverter-controlling application program, the order of priority in execution thereof, and the processing time interval of execution thereof can be set in said parameter storage unit from outside said inverter apparatus through a telecommunication means.

6. The inverter apparatus according to claim 1, further comprising a display device for displaying a state of installation of said inverter-controlling application program, the propriety of execution thereof, the order of priority in execution thereof, and a processing time interval of execution thereof.

* * * * *